(12) United States Patent
Ji

(10) Patent No.: US 11,988,299 B2
(45) Date of Patent: May 21, 2024

(54) SLAM SHUT THERMALLY TRIGGERED VALVE

(71) Applicant: Bellofram Corporation, Newell, WV (US)

(72) Inventor: Chuang Ji, Columbiana, OH (US)

(73) Assignee: BELLOFRAM CORPORATION, Newell, WV (US)

( * ) Notice: Subject to any disclaimer, the term of this patent is extended or adjusted under 35 U.S.C. 154(b) by 0 days.

(21) Appl. No.: 17/554,114

(22) Filed: Dec. 17, 2021

(65) Prior Publication Data

US 2022/0196174 A1 Jun. 23, 2022

Related U.S. Application Data

(60) Provisional application No. 63/199,290, filed on Dec. 18, 2020.

(51) Int. Cl.
| | | |
|---|---|---|
| *F16K 31/00* | (2006.01) | |
| *F16K 1/48* | (2006.01) | |
| *F16K 17/38* | (2006.01) | |
| *F16K 27/02* | (2006.01) | |

(52) U.S. Cl.
CPC ............ *F16K 31/002* (2013.01); *F16K 1/48* (2013.01); *F16K 17/383* (2013.01); *F16K 27/02* (2013.01)

(58) Field of Classification Search
CPC ...... F16K 17/003; F16K 17/32; F16K 17/383; F16K 31/002
See application file for complete search history.

(56) References Cited

U.S. PATENT DOCUMENTS

| | | | | |
|---|---|---|---|---|
| 2,420,206 A | * | 5/1947 | Smith | F16K 17/003 236/92 R |
| 2,472,070 A | * | 6/1949 | Garretson | F16K 17/30 137/498 |
| 3,392,749 A | * | 7/1968 | Gneiding | G05D 16/0658 137/484.6 |
| 3,599,658 A | * | 8/1971 | Kruzan | G05D 16/0683 137/505.46 |
| 3,809,108 A | * | 5/1974 | Hughes | G05D 16/0694 137/505.46 |
| 8,151,822 B2 | * | 4/2012 | Kranz | G05D 16/0402 137/505.47 |
| 8,225,812 B2 | * | 7/2012 | Faillat | F16K 17/164 137/553 |
| 8,485,213 B2 | * | 7/2013 | Hawkins | F16K 17/105 137/488 |
| 9,297,465 B2 | * | 3/2016 | Mevius | G05D 16/0694 |
| 2008/0258096 A1 | * | 10/2008 | Hawkins | G05D 16/0688 251/321 |

* cited by examiner

*Primary Examiner* — Umashankar Venkatesan
(74) *Attorney, Agent, or Firm* — Lippes Mathias LLP

(57) ABSTRACT

The subject innovation relates to a thermally triggered valve assembly that comprises a dual diaphragm subassembly which in turn employs a removeable thermal fuse configured to cause the valve assembly to close upon a predetermined temperature threshold being exceeded.

18 Claims, 4 Drawing Sheets

SLAM SHUT THERMALLY TRIGGERED VALVE

CROSS REFERENCE TO RELATED APPLICATIONS

The present application claims priority to U.S. Provisional patent application Ser. No. 63/199,290, filed on Dec. 18, 2020, the entirety of which is incorporated herein by reference

BACKGROUND

The following relates to the valve control arts. It particularly relates to thermal valve control for mitigating a risk of igniting a flammable substance regulated by a valve.

Conventional pressure reducing regulators control the pressure of gases within a desirable range to allow downstream devices to work properly. When a pressure reducing regulator is employed in an environment where the ambient temperature may rise to a dangerous level, proper function of downstream equipment can be detrimentally affected, and/or significant leakage can occur along, e.g., a gas pipeline or other regulated pipeline (e.g., through which flows a flammable substance). Conventional systems and/or methods do not provide adequate approaches to shut off flow (e.g., gas, liquid, etc.) through the regulator to prevent equipment damage and excessive gas emission.

The following description contemplates an improved approach that overcomes the aforementioned limitations and others.

SUMMARY

The subject innovation relates to a thermally triggered valve assembly that employs a dual diaphragm subassembly which in turn employs a removeable thermal fuse configured to cause the valve assembly to close upon a predetermined temperature threshold being exceeded.

In one embodiment, a thermal screw device, comprises a threaded screw portion configured to removably secure the thermal screw device in a valve assembly; a replaceable thermal fuse configured to deform above a predetermined temperature and as a function of sensed pressure on one side of the thermal fuse; and a lock set screw that retains the thermal fuse in place.

According to another aspect, a dual diaphragm subassembly comprises: an upper diaphragm and a lower diaphragm; a moveable piston; and a spacer that accommodates a replaceable thermal screw.

According to another aspect, slam shut valve assembly comprises: a dual-diaphragm subassembly comprising an upper diaphragm and a lower diaphragm; and a spacer comprising a threaded side hole configured to receive a threaded thermal screw device comprising a thermal fuse. The slam shut valve assembly is configured to shut off product flow when a sensing pressure applied underneath the lower diaphragm of the dual-diaphragm subassembly exceeds a predetermined pressure threshold, and when product temperature exceeds a predetermined temperature threshold that is a function of a melting point of the thermal fuse.

DETAILED DESCRIPTION

The problems to be solved relate to a "slam shut" valve that incorporates a feature to cut off gas (or liquid) flow when temperature of the flowing medium or product reaches a certain predetermined temperature. A dual-diaphragm subassembly and a thermal screw are provided to this end. It is beneficial to understand the structure of the dual-diaphragm subassembly and the thermal screw first, as are described below.

Conventional products shut off product flow at elevated temperatures and are controlled by external input. For example, turning off a solenoid valve by sending an electrical signal. The subject innovation provides a valve configured to cut off gas flow automatically on its own without external interference or input.

Figure 1:
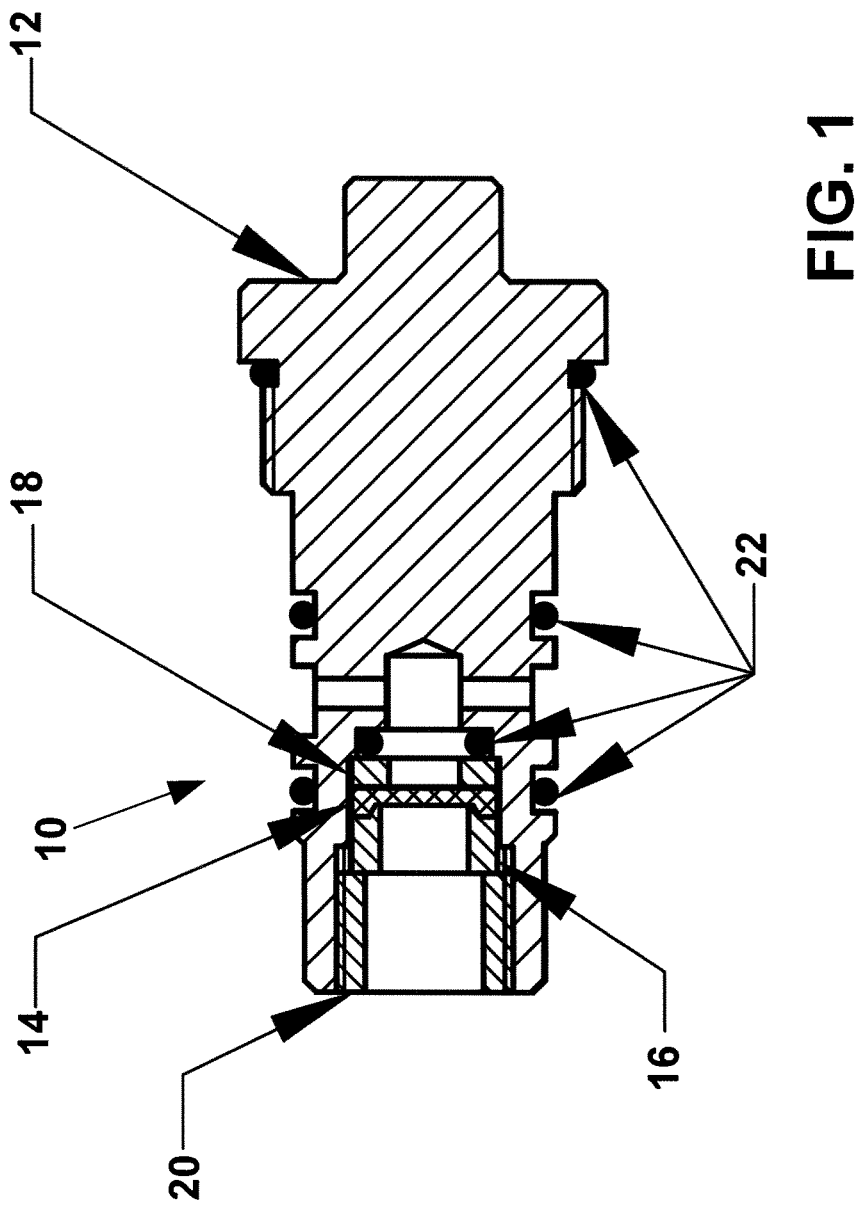
FIG. 1 illustrates a cross-sectional view of a thermal screw device that facilitates shutting off flow through a regulator valve when ambient temperature reaches a predetermined threshold, in accordance with one or more features described herein.

FIG. 1 illustrates a cross-sectional view of a thermal screw device 10 that facilitates shutting off flow through a regulator valve when ambient temperature reaches a predetermined threshold, in accordance with one or more features described herein. According to one embodiment, the thermal screw device comprises a threaded screw portion 12 that mates with a threaded side hole 124 (FIG. 2) in a spacer 116 (FIG. 2) during installation, a thermal fuse 14, two washers 16, 18, a lock set screw 20, and four O-rings 22. The thermal fuse 14 is clamped between the two washers 16, 18 as illustrated. These three parts and an O-ring placed next to the washer 18 are locked in place as the lock set screw 20 is threaded into the screw 12. All parts are stationary in operation. The thermal screw device 10 is threaded into a side hole of a spacer (See FIGS. 2-4).

In one embodiment, the thermal fuse comprises a disk (or other shape) made of Low-Density Polyethylene (LDPE). The melting point of the LDPE grade plastic in this example is controlled at, e.g., approximately 100° Celsius. When the ambient temperature rises above the melting point of the thermal fuse, it ruptures or otherwise deforms with the help of constant pressure applied on one side. It will be understood that other plastics and/or materials are contemplated in order to achieve the described outcome and that the subject innovation is not limited to LDPE type materials. For example, other materials may comprise, without being limited to, natural and/or synthetic rubber, acrylonitrile butadiene styrene (ABS) plastic, wax(es) or the like.

In another example, a fuse material having a melting point of 80° Celsius is employed. In other examples, the fuse material has a melting point in a range between 75° to 100° Celsius. In still another example, a thermal fuse melting point of, e.g., 60° Celsius or 70° Celsius, or even less, may be desired. In this case, fuse materials having such melting points are employed. For instance, in an arctic deployment of the subject slam-shut valve where normal temperatures are low even in July, a lower fuse threshold may be desired as compared to more southern areas. In such deployments, a fuse melting temperature of 60° or 70° Celsius can be advantageous, since normal daily temperatures do not approach that level in the geographic area where the device is being deployed. In this regard, a thermal fuse material can be selected to have a melting point that is only triggered by ambient temperature (or pressure) changes that exceed a normal extreme for the geographical area or altitude at which the described device is deployed. Moreover, the replaceability of the thermal fuse device makes it easy for a technician to set the thermal fuse trigger threshold according to the particular geographical area in which the device is deployed.

In another embodiment, the thermal fuse melting point can be selected (via the selected fuse material) to be a predefined percentage (e.g., 30%, 33%, 40%, 50%, or some other predefined percentage) above a highest average or record temperature for a given geographical area in which the device is deployed. For instance, if the highest average or record temperature in the deployment area is 30° C., then the fuse material employed in the thermal fuse can be made to have a melting point of 60° C., 70° C., 80° C. or some other percentage of the average or record temperature for that given geographical area. In another example, if the device is deployed in an desert area where average or record temperatures reach 50° C., then the fuse material in the thermal fuse device can be selected to have a melting point of, e.g., 75° C., 80° C., 100° C. or some other predetermined melting point.

In yet another example, the temperature threshold for triggering the valve to close is a function of the melting point of the material (plastic or the like) used in the thermal fuse, such that any desired trigger temperature threshold can be effected using a pre-selected fuse material, which may be a plastic or a combination of different plastics desired to achieve a desired melting point and thus a desired trigger point. For instance, a primary fuse material (e.g., LDPE or the like) can me mixed with another material having a lower or higher melting point to reduce or increase the melting point of the fuse to a desired temperature.

Figure 2:
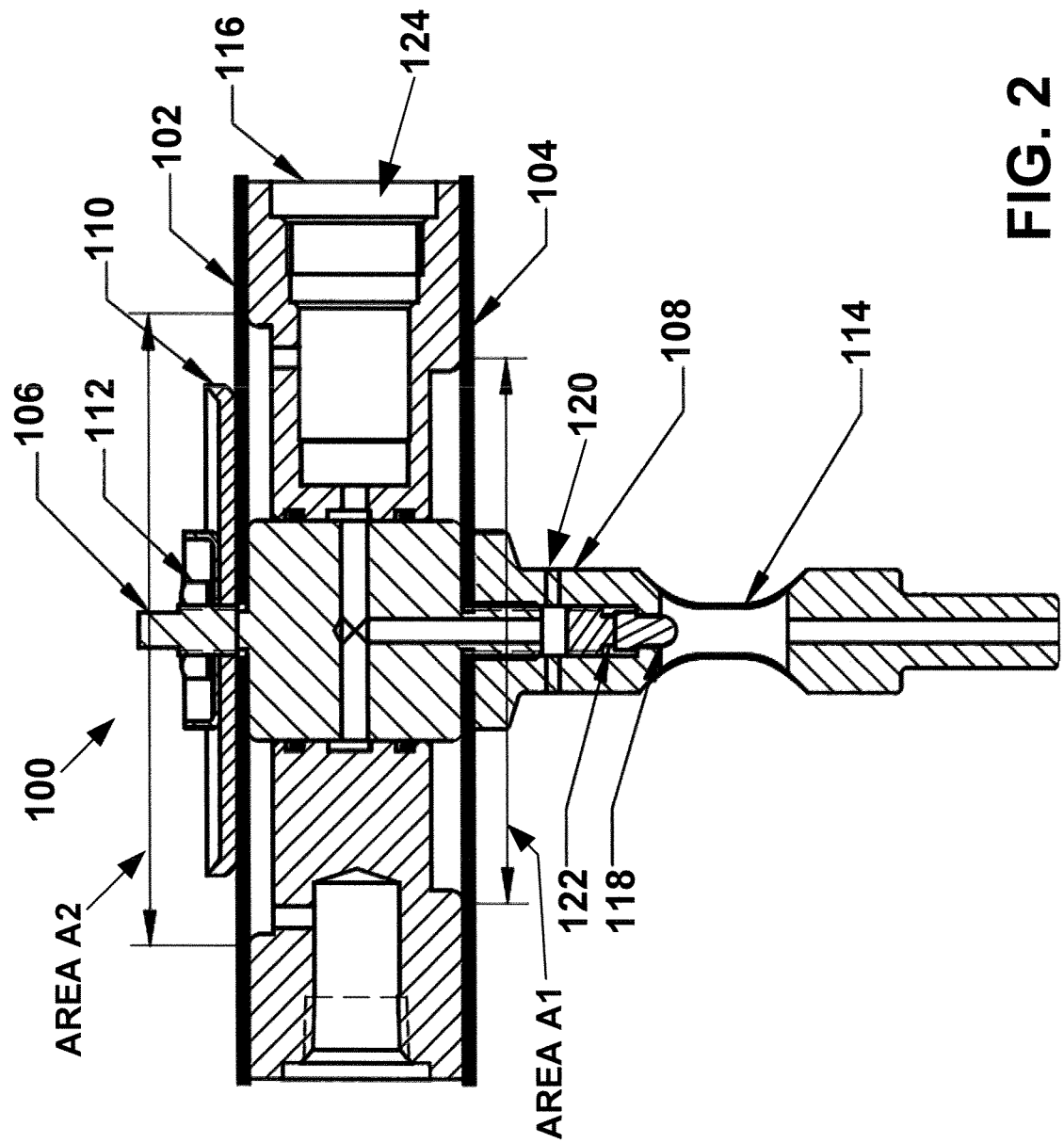
FIG. 2 shows a cross-sectional view of a dual diaphragm subassembly, in accordance with one or more features described herein.

FIG. 2 shows a cross-sectional view of a dual diaphragm subassembly 100, in accordance with one or more features described herein. The dual-diaphragm subassembly comprises two elastomeric diaphragms (an upper diaphragm 102 and a lower diaphragm 104) arranged in upper and lower positions. The diaphragms are separated by a piston 106. The lower diaphragm is held tight between the piston and a pusher post 108, as they are threaded together. The upper diaphragm is held tight between the piston and a diaphragm plate 110. They are tightened by a nut 112 threaded into the piston. The piston slides through a center hole (not shown) of a spacer 116. Two O-rings are placed in grooves located at the upper and lower sections of the center hole of the spacer to form seals. In operation, both flexible diaphragms can travel vertically up and down, which pulls or pushes the pusher post 108 accordingly. The pusher post has a center hole 114 in its stem part, as well as one or more side holes 120. A plunger 118 is placed inside a hole of pusher post with its tip sticking out of the center hole 114 of the pusher post 108. This plunger is secured by a plunger set screw 122. A side hole 124 in the spacer 116 is also provided for receiving the thermal screw device 10, which is replaceable.

The area A1 where the lower diaphragm 104 contacts the spacer 116 is designed to be smaller than the area A2 where the upper diaphragm 102 contacts the spacer 116. The area difference (e.g., A2−A1=area difference) plays a role in the proper function of the described systems and devices.

Figure 3:
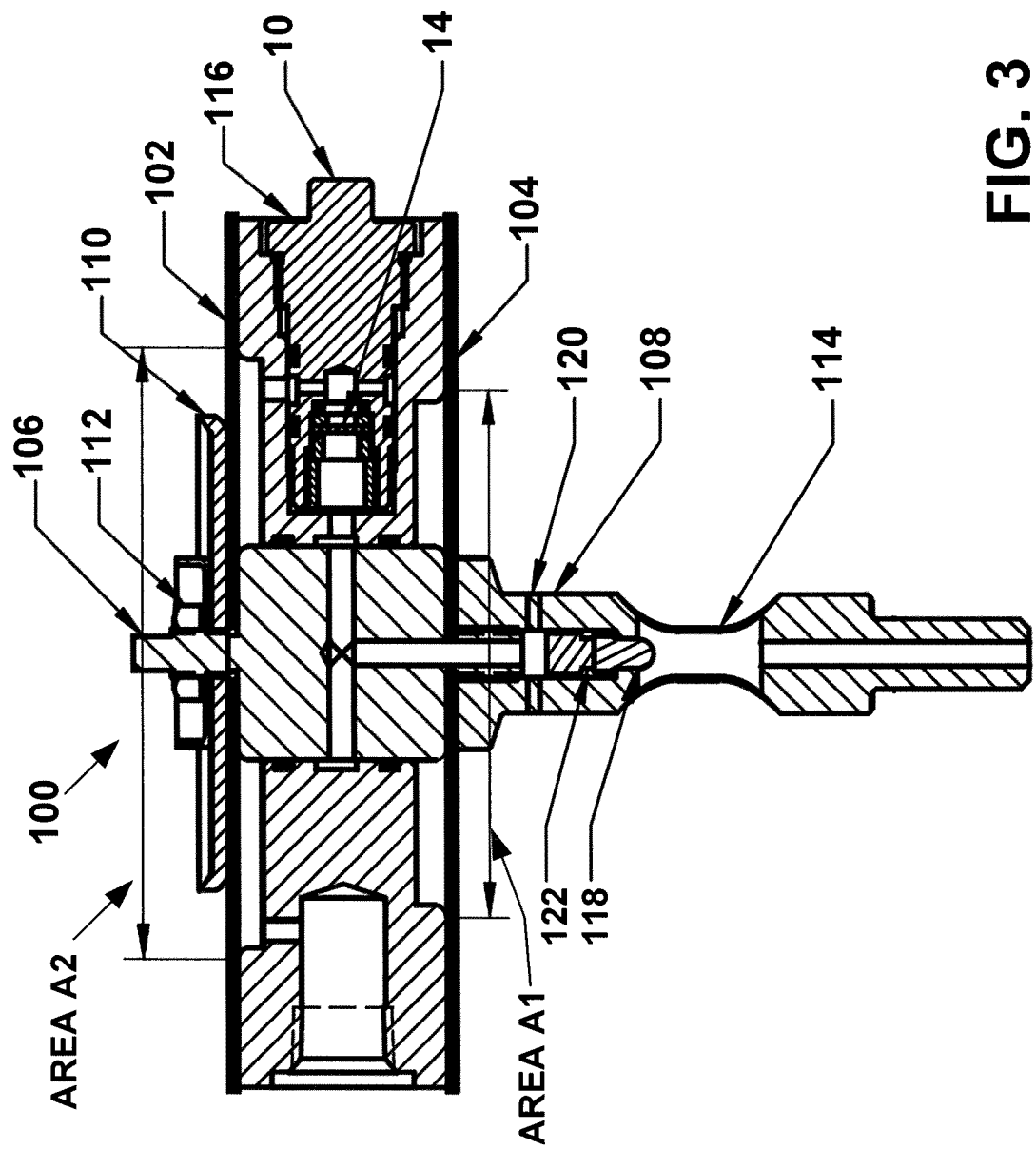
FIG. 3 illustrates a cross-sectional view of a dual diaphragm subassembly, in accordance with one or more features described herein, wherein the thermal screw device comprising the thermal fuse is inserted into the dual diaphragm subassembly.

With continued reference to FIGS. 1 and 2, FIG. 3 illustrates a cross-sectional view of a dual diaphragm subassembly 100, in accordance with one or more features described herein, wherein the thermal screw device 10 (FIG. 1) comprising the thermal fuse 14 is inserted into the spacer side hole 124 of the subassembly 100 (FIGS. 2 and 3). The set of diaphragms 102, 104 is deployed in respective effective areas and used in conjunction with the thermal fuse.

The thermal screw is threaded into the outer section of the spacer. In some conventional arrangements, a thermal fuse is deeply embedded inside a trigger assembly; However such conventional designs delay the deformation of the thermal fuse and thus the triggering event that preserves the device for which thermal protection is employed. The herein-described design enables the thermal fuse to be responsive to ambient temperature change much more quickly, due to an all-metal heat transfer path to the thermal fuse and due to placement of the thermal fuser at or near an external surface of the thermal fuse device.

The temperature threshold at which the thermal fuse is tripped is determined by the melting point of the plastic grade of the thermal fuse. In one embodiment, a LDPE plastic is used. In scenarios where a different temperature threshold is desired, a different grade of plastic, a different material, or a combination of plastics and/or materials, can be employed in the thermal fuse to achieve a higher or lower melting point as desired. In one embodiment, the thermal fuse 14 in the thermal screw device is replaceable, so that the thermal screw device is reusable. In another embodiment, the replaceability of the thermal fuse permits a technician to change the temperature threshold at which the valve is triggered to shut by replacing the thermal fuse with one having a different melting point.

The size of the spacer 116 and the effective area ratio (A1:A2) of the lower and upper diaphragms can also be adjusted to facilitate accommodating different design parameters and/or detentions with various regulators, as well as to accommodate and/or provide different levels of pressure sensing. For example, if a sensing pressure accounting for 50% of the range spring 210 (See FIG. 4) setting is desired, the diaphragm ratio A1:A2 can be roughly 1:2; if a sensing pressure is desired to be 40%, the ratio A1:A2 can be roughly 1:2.5. In another embodiment, if a sensing pressure of 33% is desired, then the A1:A2 ratio is 1:3, and so on.

In one embodiment, the effective area of the upper diaphragm is greater that that of the lower diaphragm by design of the spacer, thus facilitating enhanced thermal protection.

According to one embodiment, a sensing pressure introduced underneath the lower diaphragm of the dual diaphragm subassembly in normal condition (i.e., when the thermal fuse is intact). This sensing pressure is also introduced underneath the upper diaphragm, but is blocked by the thermal fuse in its normal (undeformed) condition. When the thermal fuse is broken (i.e., melted or deformed by heat or pressure or the like), the sensing pressure is registered underneath the upper diaphragm, causing the valve to shut.

The thermal screw is threaded into the side hole 122 of the spacer 16 during assembly and/or replacement. In operation, sensing pressure registered underneath the lower diaphragm gets inside the center hole of the piston through a side hole 120 of the pusher post. When product (e.g., gas or other product regulated by the thermally triggered valve assembly described herein) temperature is lower than the threshold, the sensing pressure is blocked by the thermal fuse from entering into the area underneath the upper diaphragm. When product temperature exceeds the threshold, the thermal fuse ruptures. Sensing pressure breaks through the thermal fuse, entering into the upper diaphragm area. Due to the greater area (A2) of the upper diaphragm relative to the area (A1) of the lower diaphragm, the force applied on the upper diaphragm is greater than the force on the lower diaphragm. The greater force overcomes the range spring force, to lift up the pusher post.

With continued reference to FIGS. 1-3, FIG. 4 illustrates a cross-sectional view of the slam shut valve assembly 200, which includes the dual-diaphragm subassembly 100 (FIGS. 2 and 3) and the thermal screw device 10 (FIG. 1), in accordance with one or more features described herein.

Figure 4:
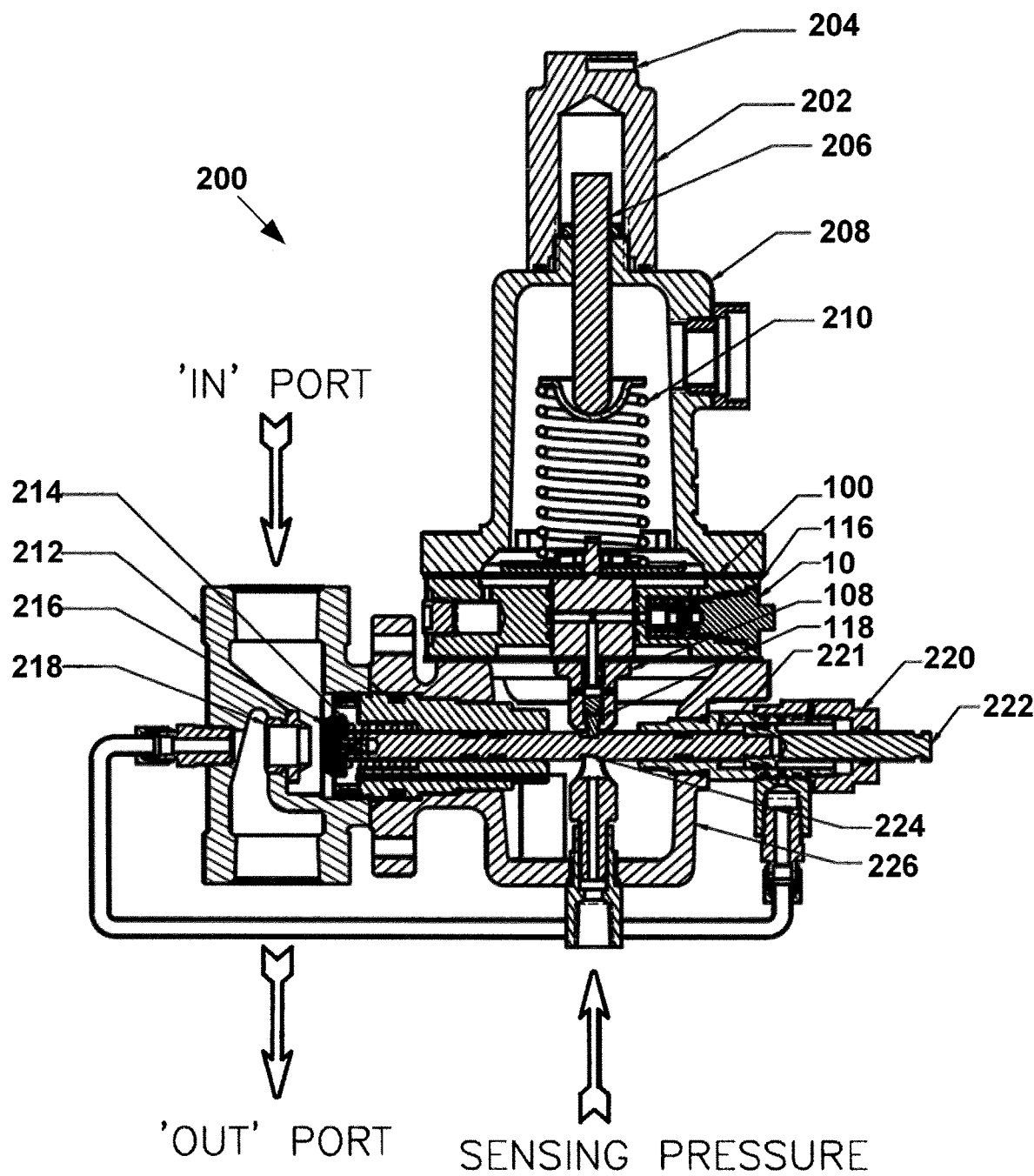
FIG. 4 illustrates a cross-sectional view of the slam shut valve assembly, which includes the dual-diaphragm subassembly and the thermal screw device, in accordance with one or more features described herein.

The slam shut valve assembly 200 comprises the dual diaphragm subassembly 100, which includes all of the features described with regard to FIGS. 2 and 3, as well as the thermal screw device 10 of FIG. 1. For purposes of illustration and due to spatial limitations in the drawing, only the thermal screw device 10, pusher post 108, spacer 116, and plunger 118 are shown in FIG. 4.

Also provided are a removeable adjustment cap 202 having a slot 204 and housing an adjustment screw 206. The adjustment screw extends into a bonnet 208 onto which the adjustment cap is mounted or otherwise affixed, and biases a range spring 210 that applies force to the diaphragm plate 110 (not shown in FIG. 4; see FIGS. 2 and 3). The slam shut valve assembly 200 also comprises a body portion 212, a loading spring 214, a main seat 216, and an orifice 218 as illustrated in FIG. 4. Also provided are an end cap 220, a stem 221, a stem extension 222, a stem pocket 224, and a diaphragm housing 226, as shown in FIG. 4.

Operation of the thermally triggered slam shut valve is further described as follows, with continued reference to FIGS. 1-4. The slam shut valve is configured to shut off the gas flow in two conditions: A) the sensing pressure applied underneath the lower diaphragm of the dual-diaphragm subassembly 100 exceeds the setting point. This function is called "over pressure protection," which can take place at any temperature within the range of product temperature rating. B) the product temperature exceeds a threshold determined by the melting point of the thermal fuse 14. This function is called "over temperature protection". Triggering of over temperature protection requires that elevated temperature and presence of sensing pressure are concurrently present. The mechanism of overpressure protection is explained first.

The main seat 216 of the valve assembly 200 may be, or comprise, a rubber disk, a nylon disk or the like. Other shapes and materials are also contemplated. The main seat shuts off gas flow when resting on the tip of the orifice 218 by the force exerted by the loading spring 214. The main seat is mounted on one end of a stem 221, which can move along its axial direction. The stem slides through a center hole 114 (FIGS. 2 and 3) of the pusher post 108. When the stem is pulled by external force (e.g., using the slotted adjustment cap 202) to move the main seat away to its open position, a concaved pocket 224 of the stem is designed to align with the tip of the plunger 118 installed inside the pusher post 108.

The pressure threshold employed to trip the overpressure protection is set by compression of the range spring 210. The compression force exerted by the range spring is transferred by the piston 106 (FIGS. 2 and 3) of the dual-diaphragm subassembly to the pusher post 108. Pushed by this force, the tip of the plunger 118 sits inside the pocket 224 of the stem to lock the stem in the open position, in which gas flows from input port to output port.

As the sensing pressure is introduced underneath the lower diaphragm of the dual diaphragm subassembly 100, it exerts a force upward to counteract the compression force of the range spring 210. When the sensing pressure rises to a point greater than the setting (via the adjustment screw), its force overcomes the compression force of the range spring, moving the dual-diaphragm subassembly upward. As the pusher post 108 moves up, the plunger 118 is pulled out of the pocket of the stem. Pushed by the loading spring 214 force, and a force exerted by the output pressure introduced to the back of the stem, the stem 221 moves towards the orifice until the main seat rests on the orifice to shut off the gas flow.

To reset the slam shut valve to its open position, first the sensing pressure is reduced below the set point. The removeable adjustment cap 202 comprises the slot 204, which is designed to be slightly bigger than the neck area of the stem extension 222. The main seat can be pulled away from its shut off position by placing the slot of the adjustment cap (after removing the adjustment cap from the bonnet 208) on neck area of the stem extension 222 and pulling the stem extension outwardly. When the tip of the plunger 118 aligns with the pocket 224 of the stem again, it is pushed into the pocket by range spring force and locks the stem in the open position.

The layout of assembly 200 shows that the thermal screw 10 is threaded into the spacer 116. The upper and lower diaphragms 102, 104, and the spacer 116, are held tightly between the bonnet 208 and the diaphragm housing 226 by fastening means (e.g., mechanical chemical, or any other suitable fastening means). In one example, a plurality of bolts (e.g., 6 or some other desired number of bolts) are used as fasteners. As the product temperature stays below a threshold, the sensing pressure is blocked by the thermal fuse from entering the area underneath the upper diaphragm. In this state, only overpressure protection functions. As the product temperature rises above the predetermined temperature threshold, heated by elevated temperature, the thermal fuse is weakened continuously. Over a time period, and depending on the actual product temperature, the thermal fuse is ruptured. The sensing pressure advances into the area underneath the upper diaphragm.

The effective area of the upper diaphragm is designed to be greater than that of the lower diaphragm. Because force is a product of pressure and effective area on which the force is exerted, the greater force exerted on the upper diaphragm can overcome the range spring force to lift up the dual-diaphragm subassembly 100. Accordingly, the plunger 118 is unrooted from the pocket 224 of the stem. The main seat 216 is released to shut off gas flow.

Concurrent presence of sensing pressure and elevated temperature trigger the function of over temperature protection. In one embodiment, the sensing pressure is designed to be a minimum of 45% of the set point to trigger over pressure protection. For instance, at a set point of 50 PSI to trigger over pressure protection, a minimum sensing pressure at 22.5 PSI is employed to trip the over temperature protection reliably.

The claimed innovation has been described with reference to the various embodiments. Modifications and alterations will occur to others upon reading and understanding the preceding detailed description. It is intended that the embodiments described herein be construed as including all such modifications and alterations insofar as they come within the scope of the appended claims or the equivalents thereof.

The invention claimed is:

1. A slam shut valve assembly, comprising:
   a dual-diaphragm subassembly comprising an upper diaphragm and a lower diaphragm; and
   a spacer comprising a threaded hole;
   a threaded thermal screw device comprising a thermal fuse installed in said threaded hole of said spacer;
   wherein the slam shut valve assembly is configured to shut off the gas flow: (i) when a sensing pressure applied underneath the lower diaphragm of the dual-diaphragm subassembly exceeds a predetermined pressure threshold, and (ii) when product temperature exceeds a predetermined temperature threshold that is a function of a melting point of the thermal fuse causing the thermal fuse to rupture and allow communication of the sensing pressure past the thermal fuse to an area underneath the upper diaphragm.

2. The slam shut valve assembly as set forth in claim 1, wherein said threaded thermal screw device comprises:
   a threaded screw portion configured to removably secure the thermal screw device in the threaded hole of said spacer;
   wherein the thermal fuse is configured to rupture above a predetermined temperature and as a function of the sensing pressure on one side of the thermal fuse; and
   a lock set screw that retains the thermal fuse in place.

3. The slam shut valve assembly as set forth in claim 2, wherein the thermal fuse comprises a Low-Density Polyethylene (LDPE) material.

4. The slam shut valve assembly as set forth in claim 3, wherein the thermal fuse is configured to deform at a temperature above 100° Celsius.

5. The slam shut valve assembly as set forth in claim 2, wherein the thermal fuse comprises a natural rubber material.

6. The slam shut valve assembly as set forth in claim 2, wherein the thermal fuse comprises an Acrylonitrile Butadiene Styrene (ABS) plastic material.

7. The slam shut valve assembly as set forth in claim 2, wherein the thermal fuse is disk-shaped.

8. The slam shut valve assembly as set forth in claim 2, wherein the thermal fuse is clamped between two washers.

9. The slam shut valve assembly as set forth in claim 2, wherein the thermal fuse is configured to deform at a temperature above 80° Celsius.

10. The slam shut valve assembly according to claim 1, wherein the predetermined pressure threshold is set by compression of a range spring, and wherein a compression force exerted by the range spring is transferred to a pusher post of the dual diaphragm assembly.

11. The slam shut valve assembly according to claim 10, wherein the sensing pressure introduced underneath the lower diaphragm of the dual diaphragm subassembly exerts a force upward to counteract the compression force of the range spring.

12. The slam shut valve assembly according to claim 11, wherein:
   the compression of the range spring is controlled by an adjustment screw; and
   when the sensing pressure exceeds a range spring compression setting applied by the adjustment screw, a force supplied by the sensing pressure on the lower diaphragm overcomes a compression force of the range spring thereby moving the dual-diaphragm subassembly upward and allowing a stem to move toward an orifice until a main seat rests against the orifice to shut off product flow.

13. The slam shut valve assembly as set forth in claim 12, wherein the dual diaphragm subassembly further comprises:
   a moveable piston engaged with the upper and lower diaphragms and slidable within a hole of the spacer.

14. The slam shut valve assembly as set forth in claim 13, wherein the dual diaphragm subassembly further comprises:
   a diaphragm plate that holds the upper diaphragm in place;
   a pusher post that holds the lower diaphragm in place and introduces a sensing pressure into the piston, wherein the pusher post includes a hole through which the stem extends; and
   a plunger secured inside the pusher post to engage the stem and hold the stem in place and that selectively disengages from the stem when the pusher post moves in response to the sensing pressure being exerted on at least one of the upper diaphragm and the lower diaphragm.

15. The slam shut valve assembly as set forth in claim 14, wherein the thermal fuse comprises at least one of:
   a Low-Density Polyethylene (LDPE) material;
   a natural rubber material; and
   an Acrylonitrile Butadiene Styrene (ABS) plastic material.

16. The slam shut valve assembly as set forth in claim 14, wherein the moveable piston is configured to allow the sensing pressure to be introduced to one side of the thermal fuse, permitting the dual diaphragm subassembly to move freely while the thermal fuse prevents the sensing pressure from leaking into an area between the upper and lower diaphragms.

17. The slam shut valve assembly as set forth in claim 1, wherein the thermal screw device provides an all-metal heat transfer path and increasing responsiveness of the thermal fuse to ambient temperature change.

18. The slam shut valve assembly as set forth in claim 17, wherein the thermal fuse is configured to deform at a temperature above 80° Celsius.

* * * * *